A. CHRISTIANSON.

DOOR OPERATING DEVICE FOR CARS.

APPLICATION FILED JUNE 9, 1911.

Reissued Jan. 16, 1912.

13,362.

3 SHEETS—SHEET 1.

WITNESSES.

J. R. Keller

Robt. C. Fotten

INVENTOR.

Andrew Christianson

By Kay & Fotten

Attorneys

COLUMBIA PLANOGRAPH CO., WASHINGTON, D. C.

A. CHRISTIANSON.

DOOR OPERATING DEVICE FOR CARS.

APPLICATION FILED JUNE 9, 1911.

Reissued Jan. 16, 1912.

13,362.

3 SHEETS—SHEET 2.

WITNESSES.

J. R. Keller

Robert C. Potter

INVENTOR.

Andrew Christianson

By Kay & Potter

Attorneys

A. CHRISTIANSON.

DOOR OPERATING DEVICE FOR CARS.

APPLICATION FILED JUNE 9, 1911.

Reissued Jan. 16, 1912.

13,362.

3 SHEETS—SHEET 3.

WITNESSES.

J. R. Keller

Robert C. Fotten

INVENTOR.

Andrew Christianson

By Kay & Fotten

Attorneys

COLUMBIA PLANOGRAPH CO., WASHINGTON, D. C.

UNITED STATES PATENT OFFICE

ANDREW CHRISTIANSON, OF BUTLER, PENNSYLVANIA, ASSIGNOR TO STANDARD STEEL CAR COMPANY, OF PITTSBURGH, PENNSYLVANIA, A CORPORATION OF PENNSYLVANIA.

DOOR-OPERATING DEVICE FOR CARS.

13,362. Specification of Reissued Letters Patent. Reissued Jan. 16, 1912.

Original No. 947,793, dated February 1, 1910, Serial No. 520,505. Application for reissue filed June 9, 1911. Serial No. 632,295.

*To all whom it may concern:*

Be it known that I, ANDREW CHRISTIANSON, a citizen of the United States, residing at Butler, county of Butler, and State of Pennsylvania, have invented a new and useful Door-Operating Device for Cars, of which the following is a specification.

My invention relates to car-door operating mechanism.

The object of my invention is to provide a door operating mechanism for hopper-bottom or other cars in which there are downwardly opening doors, its object being to provide for the quick and efficient operation of the doors without any manual labor, and at the same time so support the doors that the strain on the operating mechanism is relieved when the doors are closed.

To these ends my invention comprises, generally stated, a downwardly swinging car-door, a fluid operated cylinder, flexible connections, a locking member carried by said flexible connections, and means for releasing and securing said locking member by the movement of the piston of said cylinder.

Figure 1:
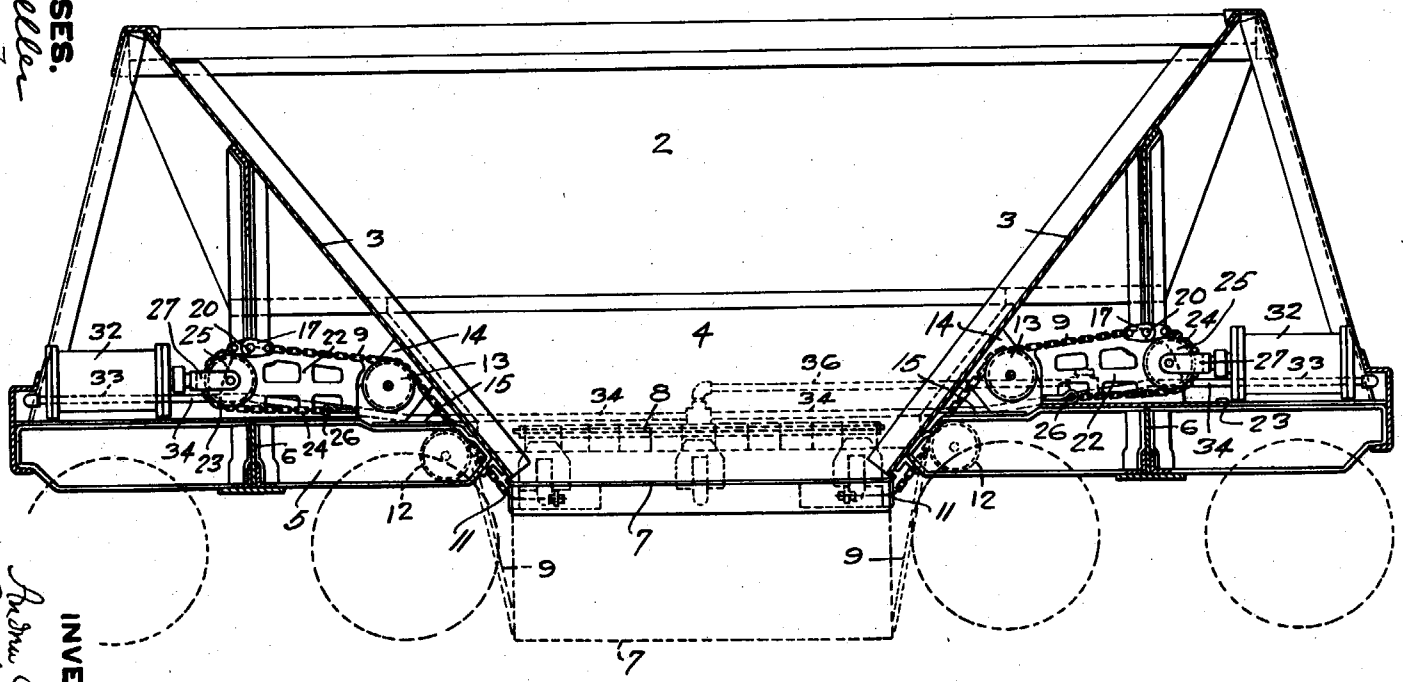
Figure 2:
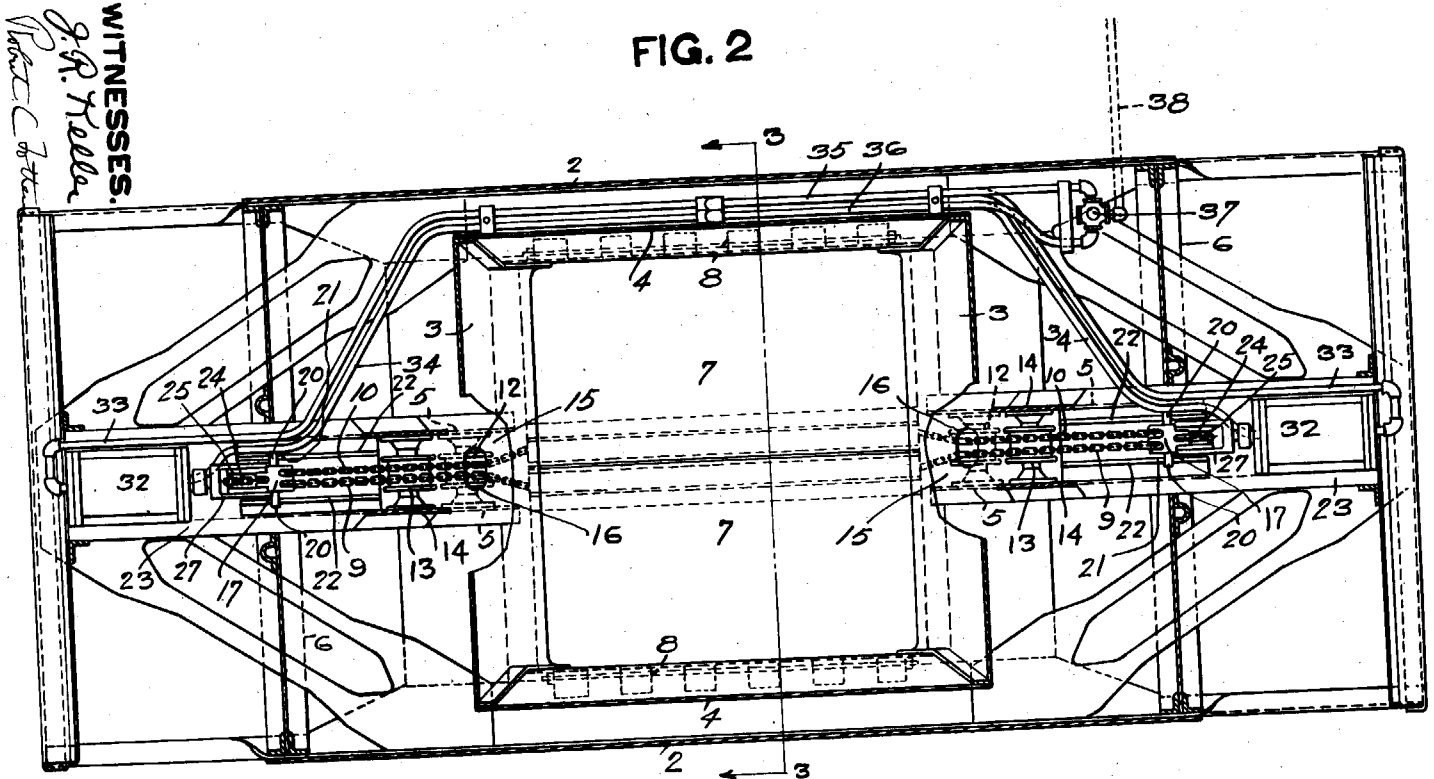
Figure 3:
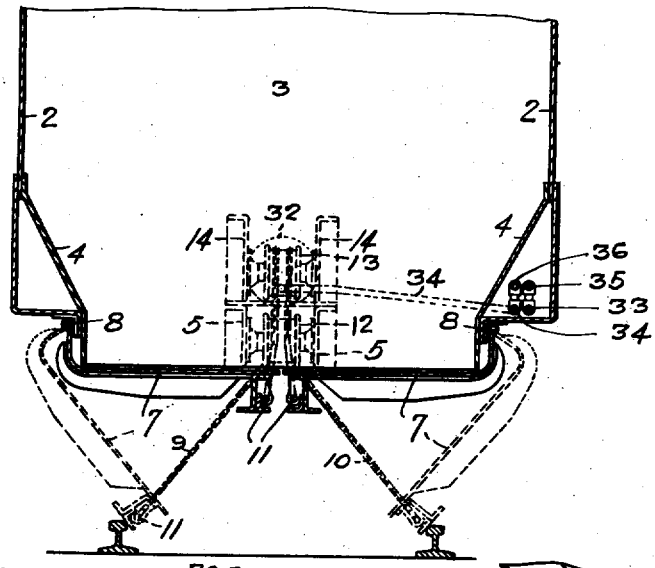
Figure 4:
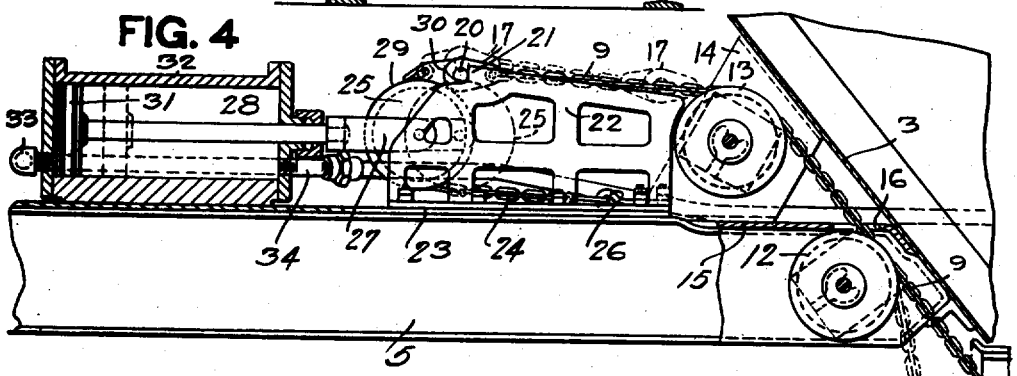
Figure 5:
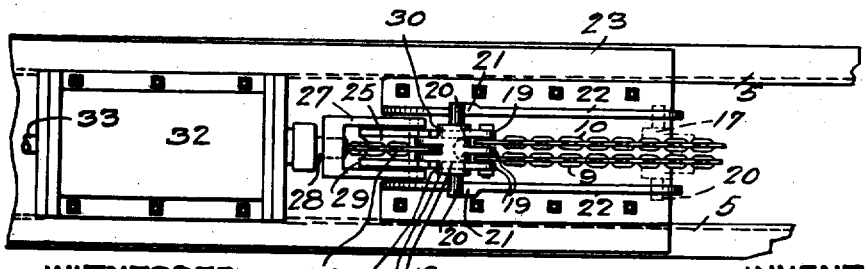

In the accompanying drawings Figure 1 is a longitudinal section of a car with my invention applied thereto; Fig. 2 is a like plan view, partly broken away to show the parts; Fig. 3 is a section on the line (3—3) Fig. 2; Fig. 4 is an enlarged detail; Fig. 5 is an enlarged detail plan view.

I have illustrated my invention in connection with a hopper-bottom car composed of the sides 2 and end floor plates 3, the hopper plates 4, the sills 5 and the bolsters 6. These features, however, form no part of my present invention, and my improved door operating mechanism may be applied to any suitable construction of car. In the form of car illustrated, the doors 7 extend longitudinally of the car, and open downwardly, said doors being engaged at 8 to the car-body. These doors are braced and strengthened by pressing ribs thereon and in other ways, as may be desired to give them the necessary durability. The chains or like flexible connections 9 and 10 are connected to the outer ends of the doors as at 11. The chains 9 connecting up with the door at one side of the car and the chain 10 with the door at the opposite side. As the operating parts are duplicated at each end of the car, I have employed the same reference numerals for the duplicate parts. The chains 9 and 10 pass over sheaves or drums 12 and 13 the sheaves 12 being mounted in the sills 5, and the sheaves 13 being mounted in the struts 14. The cover-plate 15 is provided with the opening 16 through which the chains 9 and 10 pass to the points where they are connected to the doors.

Connected to the chains 9 and 10 is the locking-member 17 which may be composed of the casting 18 having the lugs 19 to receive the ends of the chains 9 and 10, and to which said chains are secured. The locking-member 18 is provided with the trunnions 20 which are adapted to engage abutments or shoulders 21 on the brackets 22, which are bolted or otherwise secured to the cover-plate 23 on the sills 5. The brackets 22 extend to a point adjacent to the sheave 13 and the upper edges of said brackets form a support or guide for the trunnions 20 when the locking-member 18 is released and said locking member is drawn toward the sheave 13 when the door is open. The chain 24 is connected to the locking-member 18 and said chain passes around the sheave 25 and is secured at its opposite end to the support 26 bolted to the cover-plate 23. The sheave 25 is mounted in the clevis-end 27 of the piston-rod 28. The flanges 29 of the sheaves 25 are adapted to engage the hub-portions 30 of the casting 18 of the locking-member for the purpose of releasing said locking-member as fully hereinafter set forth. The piston-rod 28 has the piston 31 which moves in the cylinder 32, which is supported in any suitable manner or as illustrated, upon the sills 5. Pipes 33 and 34 lead to opposite ends of the cylinder 32 and said pipes are carried around to the side of the car where they are connected up to the pipes 35 and 36, connections from pipes 35 and 36 being made at about a mid-portion of the car, so that the motive fluid will have an equal distance to travel in passing to the cylinders 32 at the opposite ends of the car, and providing for the simultaneous operation of the pistons. A 4-way valve 37 is provided which is connected up to the supply-pipe 38.

When my invention is in use, and it is desired to open the doors to discharge the lading, the valve 37 is operated to direct the motive fluid through the pipes 33 to the outer ends of the cylinders 32. The piston-rods 28 are advanced and at the same time, the sheaves 25. The movement of the sheaves 25 with their flanges moving in contact with the hub-portions 30 of the locking-members 17, will act to raise the locking-members and release the trunnioned portions 20 thereof from engagement with the shoulders 21. Just as soon as the locking members have been raised sufficiently to free the trunnioned portions 20, the weight of the lading bearing against the doors of the car will draw the locking-member forward, together with the sheave 25, and the pistons, the doors dropping to the position indicated in dotted lines, Fig. 3. The only power required to operate the device is that required to move the sheave 25 sufficiently to release the locking-member when the weight of the lading supplies the necessary power to open the doors to the full extent. When it is desired to close the doors, the valve 37 is operated so as to admit the fluid to the front end of the cylinder 32 through the pipe 34, the exhaust taking place through the pipe 33. The return movement of the piston will act to draw up the doors to their closed position, and their locking-member will be moved back into position so that its trunnioned portion engages the shoulder 21 and just as soon as that takes place, the weight of the doors, together with the lading is carried by the locking-member and the strain of supporting the doors in no way falls on the cylinder 32, so that no motive fluid is required to hold the doors in their closed position.

It is obvious that many changes may be made in the parts of my invention which will not affect its broad scope, and I wish to include any such changes or modifications which are clearly within the broad scope of the claims.

What I claim as my invention is:

1. In a car-door operating mechanism, the combination of a swinging door, a fluid operated cylinder, flexible connections between said door and cylinder, a locking-member carried by said flexible connections, and means for releasing said locking-member by the movement of the piston of said cylinder.

2. In a car-door operating mechanism, the combination of a swinging door, a fluid operated cylinder, flexible connections between said door and cylinder, a locking-member carried by said flexible connections and supporting the entire weight of the doors, and means for releasing said locking-member by the movement of the piston of said cylinder.

3. In a car-door operating mechanism, the combination of a swinging door, a fluid operated cylinder, flexible connections between said door and cylinder, a locking-member carried by said flexible connections, an abutment with which said locking-member engages, and means for releasing said locking-member by the movement of the piston of said cylinder.

4. In a car-door operating mechanism, the combination of a swinging door, a fluid operated cylinder, flexible connections between said door and cylinder, a trunnioned locking member carried by said flexible connections, an abutment with which said locking-member engages, and means for releasing said locking-member by the piston of said cylinder.

5. In a car-door operating mechanism, the combination of a swinging door, a movable sheave, flexible connections attached to said door and engaging said sheave, a fixed abutment, a locking-member carried by said flexible connections engaging said abutment and means for releasing said locking-member by the movement of said sheave.

6. In a car-door operating mechanism, the combination of a swinging door, a movable sheave, flexible connections attached to said door and engaging said sheave, a fixed abutment, a locking-member carried by said flexible connections engaging said abutment, said locking-member being in the path of movement of said sheave.

7. In a car-door operating mechanism, the combination of a swinging door, a movable sheave, means for moving same, flexible connections attached to said door and engaging said sheave, a fixed abutment, a locking-member carried by said flexible connections engaging said abutments and means for releasing said locking-member by the movement of said sheave.

8. In car-door operating mechanism, the combination of a swinging door, a movable sheave, flexible connections attached to said door and engaging said sheave, a fixed abutment, a locking-member carried by said flexible connections engaging said abutment, means for moving said sheave, and said locking-member being engaged by the flange of said sheave to release said locking member.

9. In a car-door operating mechanism, the combination of a plurality of swinging doors, a fluid operated cylinder, a locking-member, flexible connections leading from opposite doors to said locking-member, a sheave, flexible connections from the other side of said locking-member, passing around said sheave, connected to a permanent support, connections between said sheave and piston of said cylinder, and means for releasing said locking-member by the movement of said sheave.

10. In a car-door operating mechanism, the combination of a swinging door, a fluid operated cylinder, flexible connections between said door and cylinder, a locking-member carried by said flexible connections, a movable sheave, connections between said sheave and piston of said cylinder, and means for releasing said locking-member by the movement of said sheave.

11. In a car-door operating mechanism, the combination of a swinging door, a fluid operated cylinder, flexible connections between said door and cylinder, a locking-member carried by said flexible connections, a movable sheave, connections between said sheave and piston of said cylinder, said locking-member being in the path of movement of said sheave.

12. In a car-door operating mechanism, the combination of a swinging door, flexible connections attached to said door, a locking-member carried by said flexible connections, trunnions on said locking-member, a support having an abutment with which said trunnions engage, and guides on said support with which said trunnions engage when said locking-member is released.

13. In a car-door operating mechanism, the combination of a swinging door, flexible connections attached to said door, a locking-member carried by said flexible connections, trunnions on said locking-member and a support having an abutment with which said trunnions engage, said trunnions engaging the upper edges of said support when said locking member is released.

ANDREW CHRISTIANSON.

Witnesses:

H. J. HALLERAN,

EUGENE MCCAFFERTY.

Copies of this patent may be obtained for five cents each, by addressing the "Commissioner of Patents, Washington, D. C."